Jan. 21, 1947.　　　　L. PIERCE　　　　2,414,553
GRID GLOW TIMER MOTOR CONTROL
Filed July 20, 1943　　　　2 Sheets-Sheet 1

WITNESSES:

INVENTOR
Lawrence Pierce.
BY
Paul E. Friedemann
ATTORNEY

Jan. 21, 1947.   L. PIERCE   2,414,553
GRID GLOW TIMER MOTOR CONTROL
Filed July 20, 1943   2 Sheets-Sheet 2

WITNESSES:
Alice L. Howell
Wm. C. Groome

INVENTOR
Lawrence Pierce
BY
Paul C. Friedemann
ATTORNEY

Patented Jan. 21, 1947

2,414,553

UNITED STATES PATENT OFFICE 2,414,553

GRID GLOW TIMER MOTOR CONTROL

Lawrence Pierce, Edgewood, Pa., assignor to Westinghouse Electric Corporation, East Pittsburgh, Pa., a corporation of Pennsylvania Application July 20, 1943, Serial No. 495,465

4 Claims. (Cl. 172—289)

My invention relates to electronic time limit control means, and more particularly, to a combination of electronic and electromagnetic devices for controlling the starting of electric machines, as electric motors.

The electrical art shows many starting systems for motors or other electrical devices that utilize thermoelectric or electromagnetic time limit devices. These devices while reasonably satisfactory for many applications, are invariably expensive and cumbersome.

One object of my invention is the provision of cheap electronic discharge means coacting with means controlled by the discharge means for effecting time limit control for electric devices.

Another broad object is the provision of an electronic starting control for capacitor motors.

A somewhat more specific object of my invention is the provision of a starting control for capacitor motors that include a simple, inexpensive and small electronic device in combination with suitable electromagnetic means.

A more specific object of my invention is the provision of electronic time limit means for controlling switching means that control the starting of electric motors.

A still further object of my invention is the provision of cheap electronic means for starting alternating current motors.

The objects hereinbefore recited are merely illustrative since other broader and also more specific objects and advantages of my invention will become more apparent from a study of the following specification and claims and the accompanying drawings, in which:

For one type of alternating-current time limit control now on the regular market, a special type of circuit breaker is used. This device requires a built-in relay and a transformer. The result is that the cost is high, the arrangement is complicated, and the panel space required is large. For this particular application of alternating current starting control, my device costs about half as much, is considerably simpler, and takes about one-fourth the panel-board space.

With reference to another general purpose alternating-current time limit starting control, my scheme is about one-ninth the cost, takes about one-fourth the panelboard space, and is simpler in structure and operation.

Figure 1:
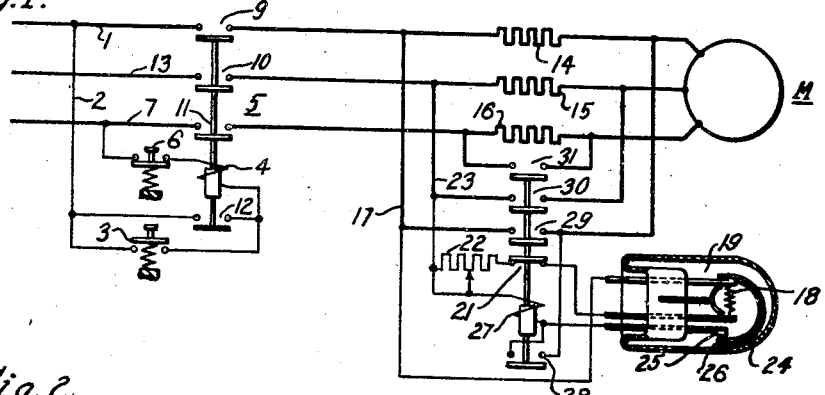
Figure 1 is a diagrammatic showing of my invention as applied to the starting of an alternating-current induction motor.

In Fig. 1, M designates an induction motor that is to be gradually brought up to speed. The contactor 5 is the usual line contactor used for such motors, and when operated, energizes the motor M through the starting resistors 14, 15, and 16 comprising the starting connections for the motor M.

The element 19 is a small electronic discharge tube comprising a vitreous envelope or the like and including in the envelope a gaseous environment such as neon, argon, or similar ionizable medium. The particular tube shown in Fig. 1 has three spaced electrodes. To one of the electrodes I connect a bimetal element 24 which when heated to a given relatively high temperature, makes contact with the third electrode to complete a circuit. Between the one electrode and the second electrode I provide a heating filament. A reflector directs the heat against the bimetal. For any selected voltage applied to the filament, the heating rate of the filament is given function so that the bimetal makes contact with the third electrode after a selected time. When this time expires, an electric relay or contactor is energized, and the effect of the starting resistors 14, 15, and 16 are eliminated, and the motor M is connected to the supply through its running connections.

Figure 2:
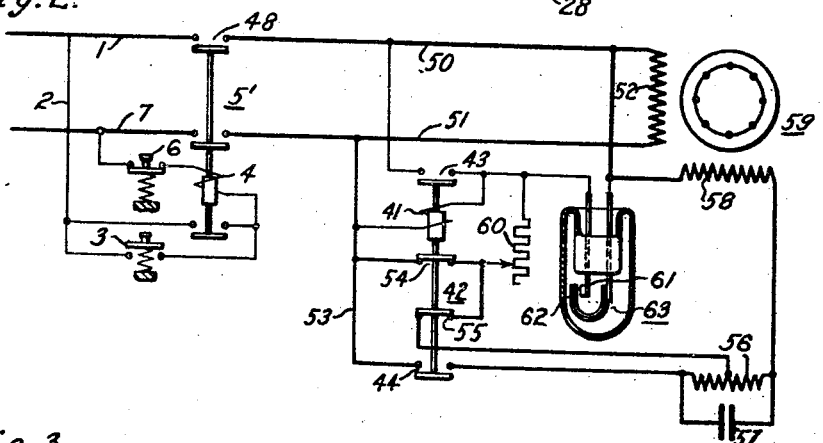
Figs. 2 and 3 show two modifications of my invention as applied to start capacitor motors.

A still better understanding can probably be had from a study of a sequence of a typical starting cycle. To start the motor M, the attendant operates pushbutton switch 3, whereupon a circuit is established from bus 1 through conductor 2, switch 3, the actuating coil 4 of contactor 5, stop switch 6 to the bus 7. Operation of the contactor 5 closes the contact members 9, 10, 11, and 12. The closure of contact member 12 establishes a holding circuit for the coil 4 to thus maintain contactor 5 in the operated position. Closure of contact members 9, 10, and 11 connects the buses 1, 13, and 7 to the motor M through the starting resistors 14, 15, and 16 or starting circuit connections for the motor M. Another circuit is established from bus 1 through conductor 17, filament 18 of the electronic device 19, contact members 21, adjustable resistor 22, and conductor 23 to the source of supply. The filament 18 is thus heated, and the rate of heat being adjusted by the resistor 22 causes the bimetallic member 24 to bend upwardly at the lower end and in a predetermined time close the contacts 25 and 26, whereupon a circuit is established from the energized conductor 17 through the bimetallic element 24, contacts 25 and 26, coil 27 of the starting control relay to the energized conductor 23. This relay thus operates, closing contact members 28, 29, 30, and 31. Closure of contact members 28 and 29 provide a holding circuit for the coil 27 independent of the electronic device 19, whereas the closure of contact members 29, 30, and 31 connects the motor M through the running connection through the source of supply. Contact members 21 are opened to disconnect the electronic device 19 from the source of supply. In Fig. 2, the line contactor is similar to the line contactor shown in Fig. 1, and when it is caused to operate, a circuit is established from the energized conductor 51 through conductor 53, contact members 54, the adjustable resistor 60, electrode 61, electrode 62 to the conductor 50. The electronic device 63 is of the glow type, and the voltage across the electrodes is so adjusted by the resistor 60 that it will be sufficient to break down and cause a glow discharge current to flow, and yet the current is kept small enough so that a maximum time of operation may be obtained from the electronic device 63.

As here shown, the time adjustment for the electronic device appears to be affected only by the adjustable resistor 60. There are, however, several other methods by which the time constant of this type of device may be adjusted. For instance, the spacing of the electrodes 61 and 62 may be changed in the manufacture of the device, or the electrode may be shielded to decrease the dissipation of the heat from the bimetallic member to thus increase the time the electrodes, namely, the contacts 61 and 62, remain open.

Time may also be changed by suitable selection of the gaseous medium within the chamber of the electronic device. The electrodes are of the highly polished type, they radiate heat more slowly, and, therefore, change the time of operation of the device.

When the line contactor shown in Fig. 2 is first closed, not only is the electronic device 63 energized, but also the motor 59. The main winding 52 is energized directly from buses 50 and 51, and the auxiliary winding 58 is energized by a circuit that may be traced from the energized conductor 53 through contact members 54 and 55, the reactor 56 and capacitor 57, winding 58, to the conductor 50. As the glow discharge current heats the bimetal 62 constituting one of the electrodes, the contacts 61 and 62 may contact with each other after a predetermined time, whereupon a direct connection is established, and a much higher current is caused to flow through the circuit which now actuates the coil 41 of the relay 42 to close the contact members 43 and 44 and open the contact members 54 and 55. Contact members 44 change the motor connection from the starting connection, which includes one portion of the reactor 56 to a running connection that includes another portion of the reactor 56, the capacitor 57 in each case remaining in the circuit.

Closure of contact member 43 shunts the electrodes to thus eliminate the electronic device from the source of supply.

Figure 3:
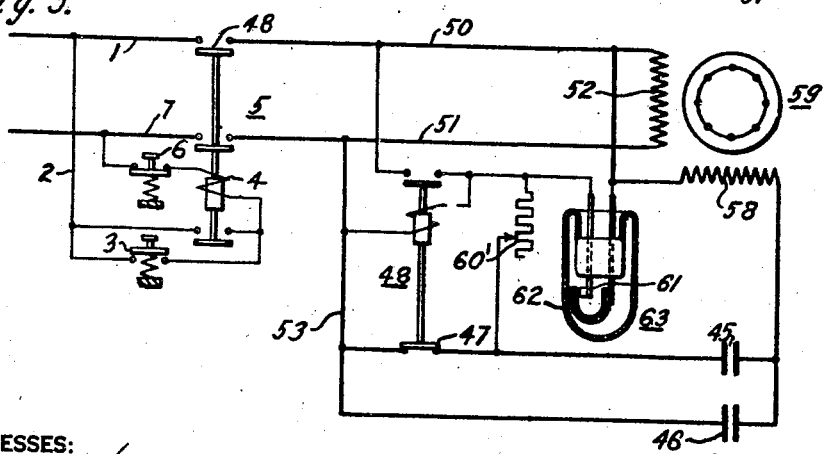

In Fig. 3, the arrangement is somewhat similar to that shown in Fig. 2 except that in this case the capacitor motor utilizes a pair of capacitors 45 and 46, both of which are in the circuit during the starting cycle, whereas during the running circuit connection for the motor, capacitor 46 is eliminated from the circuit by the opening of the contact members 47 on the relay 48. Resistor 60' functions similarly to resistor 60 in Fig. 2.

Figure 4:
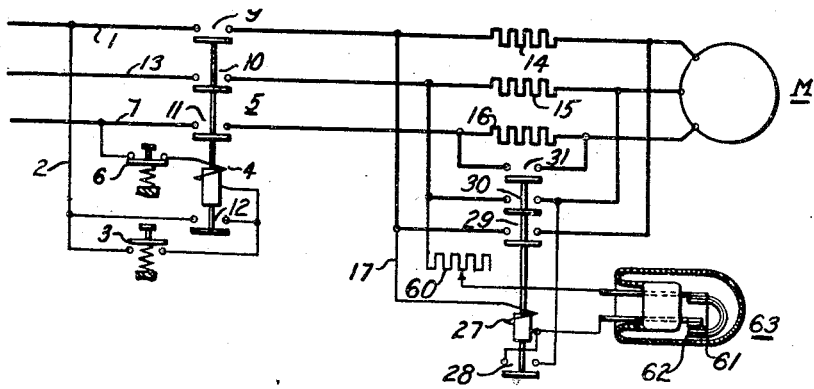
Fig. 4 is a further modification of my invention.

The showing in Fig. 4 is somewhat similar to that shown in Fig. 3 except that the starting control is provided for an induction motor, such as is shown in Fig. 1.

Figure 5:
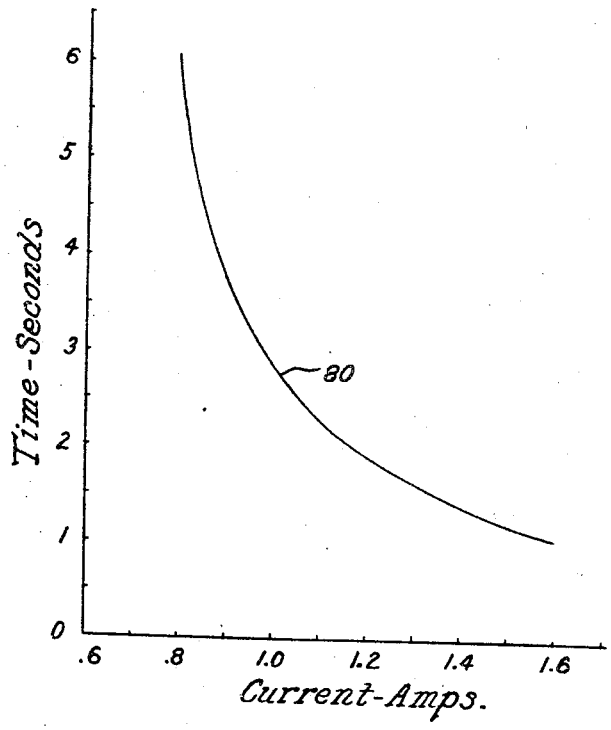
Fig. 5 illustrates by means of a curve the time limit control I can obtain with my starting control.

In Fig. 5 the curve 80 shows the variation in time with variations in glow discharge currents of an electronic device, as 63. It will be noted that as the glow discharge current is increased, the time of operation decreases. It will also be noted that for a predetermined decrease in the current, the time becomes greater and greater. There is, however, a definite limitation to this type of electronic device, since if an attempt is made to decrease the current in the glow discharge device below a predetermined value by an adjustment of the resistor in series with the electrode or some other means, the glow discharge will not flow, and, in consequence, the current immediately drops to zero and, theoretically as well as practically, an infinite time would be required to cause the relay to operate, that is, it will not operate.

The embodiment and several modifications of my invention herein disclosed are merely illustrative, and I do not wish to be limited to the particular showing made, but wish to be limited only by the scope of the claims hereto appended.

I claim as my invention:

1. In a starting control for an electric motor, in combination, a motor having starting circuit connections and running circuit connections, electronic discharge means, electric potential supply means, switching means for connecting said motor through the starting circuit arrangement to said supply means and for connecting said discharge means to the supply means, said discharge means having a pair of spaced electrodes disposed in an ionizable gaseous medium and between which a glow discharge current occurs upon connection of said discharge means to said supply means, said electrodes having the characteristic of making contact with each other after the discharge current flows between the electrodes for a given time, electromagnetic switching means including an operating coil, circuit means connecting said operating coil with said electrodes such that said operating coil carries current of the glow discharge, which current is insufficient in amount to effect operation of said electromagnetic switching means, said circuit means being effective upon contacting of said electrodes to sufficiently energize said operating coil to effect operation of said electromagnetic switching means, and circuit means connected with said electromagnetic switching means arranged for changing the connection of said motor to the supply means from the starting circuit connection to the running circuit connection, and means forming a part of said second switching means for deenergizing said electrodes upon operation of said second switching means.

2. In a system of control, in combination, an electric load unit having a starting circuit arrangement and a running circuit arrangement, electronic discharge means having spaced electrodes disposed in an ionizable gaseous medium and between which a glow discharge current occurs upon application of a potential to said electrodes to thus heat the electrodes in excess of the heat dissipation from the electrodes, said electrodes having the characteristic to contact each other upon being heated, after a certain time, to a given temperature, switching means having an operative and an inoperative position, said switching means in its operative position being adapted to alter the circuit arrangement of the load unit from the starting circuit arrangement to the running circuit arrangement, circuit means connecting said electrodes with said switching means to effect operation thereof when said electrodes contact, and contacts on said switching means for establishing an energizing circuit for said electrodes when said switching means is in its inoperative position.

3. In a starting control for an electric motor, a source of electric potential, a motor, starting connections for the motor, running connections for said motor, switching means for connecting the motor to said source of potential through said starting connection, a glow-discharge tube containing an ionizable gaseous medium and having a pair of spaced electrodes, means in said tube for producing a glow discharge upon the application of an electrical potential thereto for producing a rise in temperature in said tube, one of said electrodes being temperature responsive and being disposed to make contact with the other electrode upon being heated to a given temperature, circuit means operable in conjunction with said switching means for applying an electric potential to said means in said tube for producing a glow discharge, means for adjusting the value of said electrical potential whereupon said electrodes will be caused to make contact with each other at any adjusted time after connection of said motor to said source of potential electromagnetic switching means including an operating coil, circuit means connecting said operating coil with said glow discharge tube such that said operating coil carries current of the glow discharge which current is insufficient in amount to effect operation of said electromagnetic switching means, said circuit means being effective upon contacting of said electrodes to sufficiently energize said operating coil to effect operation of said electromagnetic switching means, and circuit means connected with said electromagnetic switching means arranged to change the connection of said motor to said source of potential through said running connections, and means forming a part of said electromagnetic switching means, constructed and arranged to deenergize said glow-discharge tube upon operation of said electromagnetic switching means.

4. In a starting control for an electric motor, a source of electric potential, a motor, starting connections for the motor, running connections for said motor, switching means for connecting the motor to said source of potential through said starting connection, a glow discharge tube containing an ionizable gaseous medium and having a pair of spaced electrodes, means in said tube for producing a glow discharge upon the application of an electrical potential to said electrodes for producing a rise in temperature in said tube, one of said electrodes being temperature responsive and being disposed to make contact with the other electrode upon being heated to a given temperature, circuit means operable in conjunction with said switching means for applying an electrical potential to said electrodes, whereupon said electrodes will be caused to engage each other a given time after connection of said motor to said source of potential, electromagnetic switching means including an operating coil, circuit means connecting said operating coil with said electrodes such that said operating coil carries current of the glow discharge, which current is insufficient in amount to effect operation of said electromagnetic switching means, said circuit means being effective upon contacting of said electrodes to sufficiently energize said operating coil to effect operation of said electromagnetic switching means, and circuit means connected with said electromagnetic switching means arranged to change the connection of said motor to said source of potential through said running connections, and means forming a part of said electromagnetic switching means for rendering the means in said tube for producing a glow discharge inoperative upon operation of the electromagnetic switching means.

LAWRENCE PIERCE.